United States Patent [19]
Ikeda et al.

[11] Patent Number: 5,959,213
[45] Date of Patent: Sep. 28, 1999

[54] SEMICONDUCTOR DIFFERENTIAL PRESSURE MEASURING DEVICE

[75] Inventors: Kyoichi Ikeda; Tetsuya Watanabe; Satoshi Fukuhara; Takashi Yoshida; Hideo Tsukamoto, all of Tokyo, Japan

[73] Assignee: Yokogawa Electric Corporation, Tokyo, Japan

[21] Appl. No.: 08/891,105

[22] Filed: Jul. 10, 1997

Related U.S. Application Data

[63] Continuation of application No. 08/631,595, Apr. 15, 1996, abandoned.

[30] Foreign Application Priority Data

Jul. 14, 1995 [JP] Japan ................................. 7-178745
Feb. 14, 1996 [JP] Japan ................................. 8-026749

[51] Int. Cl.⁶ ............................. G01L 9/04; G01L 9/00
[52] U.S. Cl. .......................................... 73/720; 73/717
[58] Field of Search ........................... 73/702, 704, 717, 73/718, 719, 720, 721

[56] References Cited

U.S. PATENT DOCUMENTS

| | | | |
|---|---|---|---|
| 2,979,955 | 4/1961 | Shepler | 73/720 |
| 3,625,061 | 12/1971 | Schwarz | 73/720 X |
| 4,311,053 | 1/1982 | Cucci | 73/704 |
| 4,390,925 | 6/1983 | Freud | 73/718 X |
| 4,445,383 | 5/1984 | Binder et al. | 73/718 |
| 4,455,874 | 6/1984 | Paros | 73/704 |
| 4,559,829 | 12/1985 | Bianchi et al. | 73/717 X |
| 4,625,560 | 12/1986 | Sanders | 73/718 |
| 4,852,408 | 8/1989 | Sanders | 73/718 |
| 5,123,282 | 6/1992 | Ikeda et al. | 73/704 |
| 5,165,289 | 11/1992 | Tilmans | 73/862.59 |
| 5,275,055 | 1/1994 | Zook et al. | 73/702 X |
| 5,375,473 | 12/1994 | Ikeda et al. | 73/720 |
| 5,444,901 | 8/1995 | Weigand et al. | 73/718 X |

FOREIGN PATENT DOCUMENTS 0115178  9/1979  Japan ................................. 73/720

Primary Examiner—Harshad Patel
Assistant Examiner—Robin Clark
Attorney, Agent, or Firm—Moonray Kojima

[57] ABSTRACT

A semiconductor differential pressure measuring device comprising two measurement diaphragms and two detection sensors provided in a semiconductor substrate using micromachining techniques, and a computing circuit which computes the differences between the two sensor outputs, wherein a communicating hole is provided for applying pressure to each diaphragm so that the diaphragms operate in opposite phases by differential pressure, and two detecting sensors are provided on each diaphragm for detecting displacement or strain of each diaphragm caused by the differential pressure applied to the respective diaphragm, whereby detecting the differences in displacement or strain cancels the static pressure error and temperature error so that the invention has excellent temperature and static pressure characteristics, and whereby the computing circuit comprises a bridge using the two detecting sensors, which substantially reduces the cost of the device.

7 Claims, 16 Drawing Sheets

SEMICONDUCTOR DIFFERENTIAL PRESSURE MEASURING DEVICE

This is a continuation of Ser. No. 08/631,595 filed Apr. 15, 1996, now abandoned.

BACKGROUND OF THE INVENTION

1. Field of Invention

This invention relates to a semiconductor differential pressure measuring device which has excellent static pressure and temperature characteristics and is economical to produce and operate.

2. Description of Related Art

FIG. 1 shows an example of a conventional differential pressure measuring device, such as disclosed in Japanese Patent application No. S59-56137 (1984), wherein flanged 2 and 3 are assembled with close fit and fixed, such as by welding, to both sides of housing 1. Inlet port 5, used to apply high pressure fluid of pressure $P_H$ to be measured, and inlet port 4, used to apply low pressure fluid of pressure $P_L$ to be measured, are provide in flanges 2 and 3, respectively.

Housing 1 contains pressure measuring chamber 6 comprising center diaphragm 7 and silicon diaphragm 8, which are separately fixed to the wall of pressure measuring chamber 6, so that pressure measuring chamber 6 is divided into two by both diaphragms 7 and 8. On the walls of chamber 6, facing center diaphragm 7 are backplates 6A and 6B. The circumference of center diaphragm 7 is welded to housing 1. The entire silicon diaphragm 8 may comprise a single crystal silicon substrate.

Four strain gages 80 are formed by selectively diffusing impurities, such as boron, on one side of the silicon substrate, while the other side of the substrate is machined and etched to form the complete side as a concave diaphragm. Four strain gages 80 operate in such a manner that two of the four gages are subjected to tension and the other two are subjected to compression when the silicon diaphragm is deflected due to differential pressure ΔP. These four strain gages are connected together to form a Wheatstone bridge, and the resistance change is detected as a change in the differential pressure ΔP.

Leads 81 have one end thereof connected to strain gage 80. The other end of leads 81 are connected to hermetic terminals 82. Support 9 is provided with the hermetic terminals. Silicon diaphragm 8 is adhered to the end face of pressure measuring chamber 6 of support 9 by a suitable method, such as bonding with low melting point glass.

Pressure inlet cells 10 and 11 are formed between housing 1 and flange 2 and between housing 1 and flange 3, respectively. In pressure inlet cells 10,11, liquid blocking diaphragms 12 and 13 are provided, respectively, and on the walls of housing 1 facing liquid blocking diaphragms 12,13, backplates 10A and 11A, having similar shapes to liquid blocking diaphragms 12,13, are formed.

Spaces formed with liquid blocking diaphragms 12,13 and backplates 10A and 11A, respectively, are connected to pressure measuring chamber 6 through communicating holes 14,15. Spaces between liquid blocking diaphragms 12,13 are filled with liquids 101,102 such as silicone oil. The liquids reach the upper and lower faces of silicon diaphragm 8 through communicating holes 16,17. Fill liquids 101 and 102 are separated by center diaphragm 7 and silicon diaphragm 8, but the arrangement controls the placement of the liquids so that the two volumes of liquid are nearly equal.

If the pressure is provided at the high pressure side, the pressure which acts on liquid blocking diaphragm 13 is transmitted to silicon diaphragm 8 by fill liquid 102. On the other hand, if a pressure is provided at the low pressure side, the pressure which acts on liquid blocking diaphragm 12 is transmitted to silicon diaphragm 8 by fill liquid 101. Consequently, silicon diaphragm 8 is deflected in accordance with the pressure difference between the high pressure and low pressure. This deflection is detected by strain gage 80 and measurement of differential pressure is thus effected. However, such a device is adversely affected by static pressure which causes static pressure error.

In order to compensate for the static pressure error, diffusion strain gages $G_d$ and $G_s$ are provided on thin wall part 8a and thick wall part 8b of silicon diaphragm 8, as shown in FIG. 2. Strain gage $G_d$ on thin wall part 8a detects deformation of thin wall part 8a due to the differential pressure ΔP. Strain gage $G_s$ on thick wall part 8b detects the value of static pressure $Sp$ by sensing the deformation in silicon diaphragm 8 caused by the difference in deformation between silicon diaphragms 8 and support 9, when static pressure $S_p$ is applied to the entire detector.

The output change of strain gages $G_d$ and $G_s$ due to differential pressure ΔP is as shown in FIG. 3. The output change in strain gages $G_d$ and $G_s$ due to static pressure $S_p$ is as shown in FIG. 4. That is to say, when differential pressure ΔP is applied, the output of strain gages $G_d$ and $G_s$ varies.

For this reason, applied differential pressure ΔP is determined by using the following equation (1)

$$\Delta P = \sum_{i=0}^{n} \sum_{j=0}^{m} K_{ij} \times G_d^{\,i} \times G_s^{\,j} \tag{1}$$

In this case, since the outputs of strain gages $G_d$ and $G_s$ are closely correlated, separation of outputs is not sufficient. Thus, there are problems that make correction computations of higher orders (n,m) necessary, and accuracy after correction is still not sufficient.

SUMMARY OF THE INVENTION

Accordingly, an object of the invention is to overcome the aformentioned and other disadvantages and deficiencies of the prior art.

Another object is to provide a semiconductor differential measuring device which has good static pressure and temperature characteristics, and which can also be manufactured and operated with optimal economy.

DETAILED DESCRIPTION OF THE PREFERRED EMBODIMENTS

Figure 1:
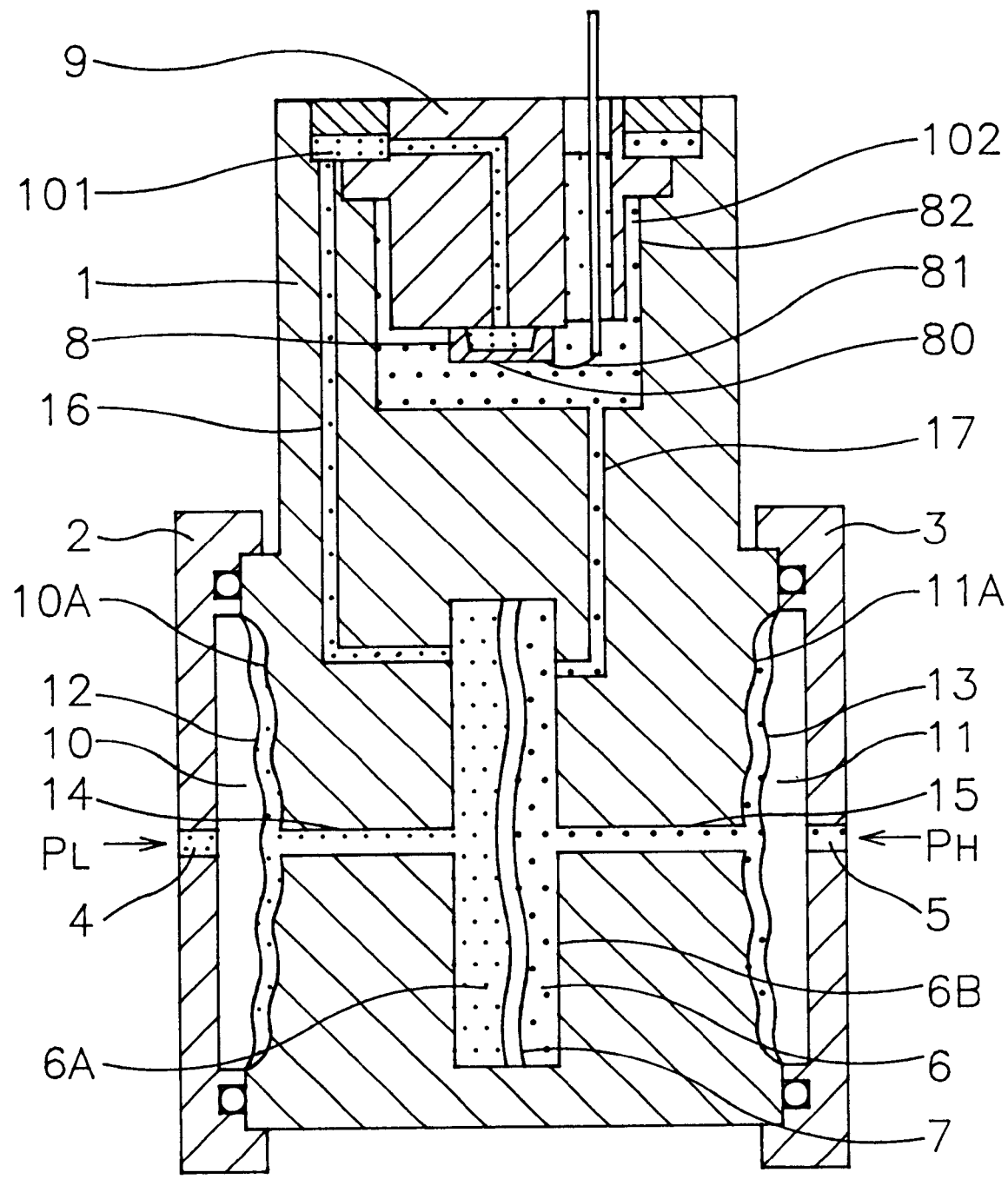
FIG. 1 is a cross sectional view depicting an exemplary conventional differential pressure measuring device.
Figure 2:
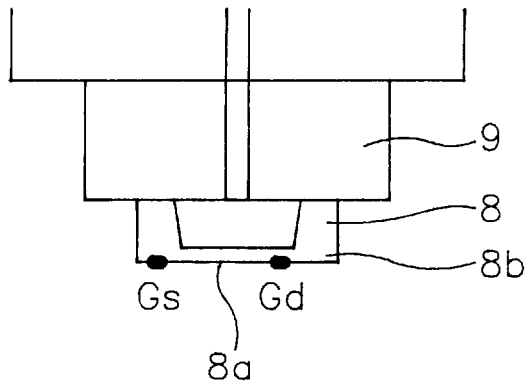
FIG. 2 is a drawing depicting details of the essential parts of the device of FIG. 1.
Figure 3:
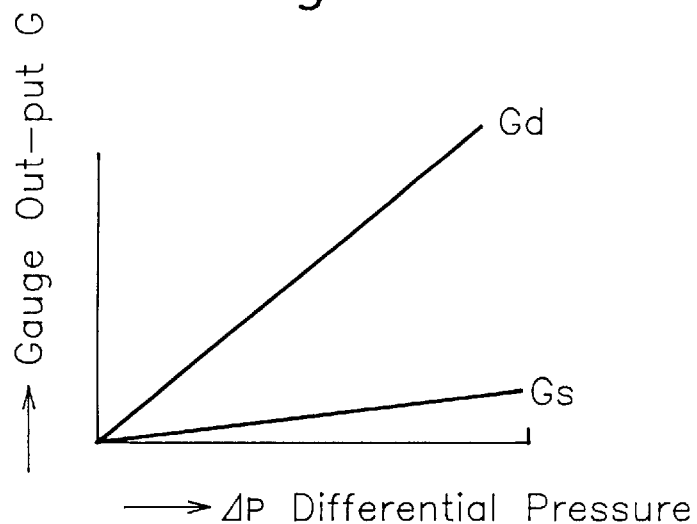
FIG. 3 is a graph depicting operation of the device of FIG. 1.
Figure 4:
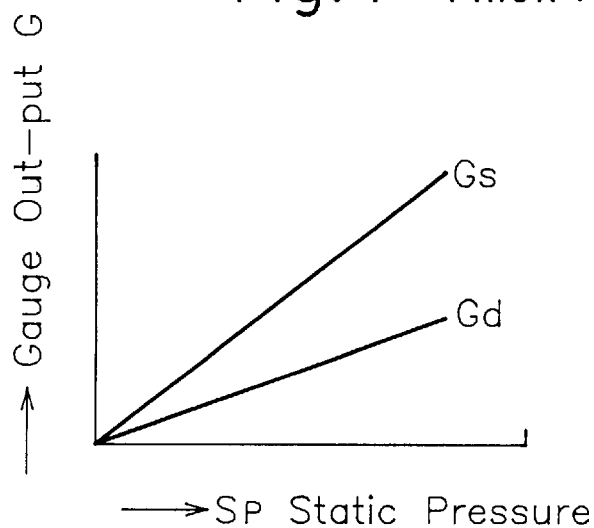
FIG. 4 is another graph depicting operation of the device of FIG. 1.

The first illustrative embodiment is set forth in FIGS. 5–9, wherein the same symbols used in FIG. 1 represent the same functions and wherein only the differences from FIG. 1 are described thereat for sake of clarity of description. First measuring cell 21 comprises an extremely small gap, which is provided in silicon substrate 22 and forms first measuring diaphragm 23 on one side 22a of the silicon substrate. First concave portion 24 is provided on the surface of one side 22a of silicon substrate 22 and on the opposite side of first measuring diaphragm 23, and is very shallow. Second measuring cell 25 comprises an extremely small specified gap, which is provided in silicon substrate 22 and forms second measuring diaphragm 26 having the same effective area as the first measuring diaphragm 23. Second concave portion 27 is provided on the surface of one side 22a of silicon substrate 22 and on the opposite side of second measuring diaphragm 26, and is very shallow. Support substrate 28 is provided with one side 28a thereof in contact with one side 22a of silicon substrate 22 and forms first concave portion 24 and third measuring cell 29, and also forms second concave portion 27 and fourth measuring cell 31.

In addition, first, second, third and fourth measuring cells 21, 25, 29 and 31 are fabricated with extremely small gaps in the direction of the excess pressure backup so that measuring diaphragms can be prevented from being ruptured from the backup when excessive pressure is applied. For example, the gap is approximately 1 μm. But, in FIG. 5 the gaps in the direction of the backup are shown to be overly large for the purpose of enabling the reader to better understand the invention.

A first communicating hole 32 is provided in silicon substrate 22. Measuring pressure $P_H$ on one side is introduced from one end of hole 32. The other end of hole 32 is communicated with a third measuring cell 29 and second measuring cell 25. A second communicating hole 33 is provided in silicon substrate 22. Measuring pressure $P_L$ on the other side is introduced from one end of hole 33. The other end of hole 33 is communicated with a fourth measuring cell 31 and first measuring cell 21. The connection of the communicating holes 32,33 is represented in a different manner from a practical one to enable the reader to better understand the relationship in the connection of second communicating hole 33 with third measuring cell 29 and second measuring cell 25 or for the connection of second communicating hole 33 with fourth measuring cell 31 and first measuring cell 21. In practice, the relationship between the connections is as shown in FIGS. 6 to 9.

Figure 10:
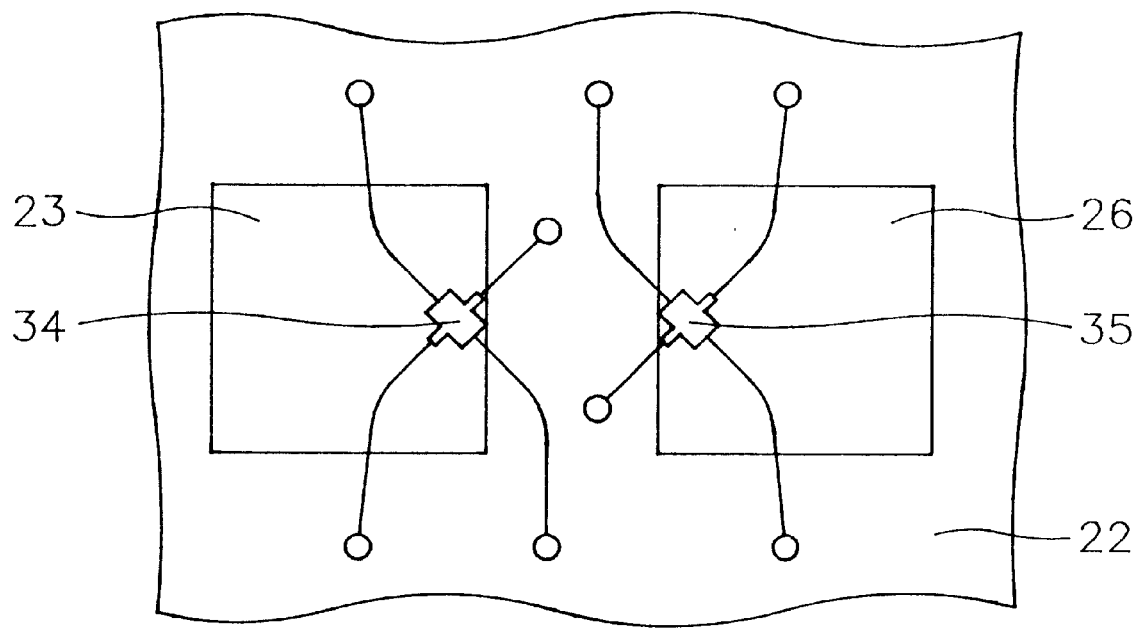
FIG. 10 is a drawing depicting details of parts of the embodiment of FIG. 5.

A first sensor 34 is provided to detect strain caused in first measuring diaphragm 23. In this instance, the first sensor uses a shearing strain detection element. A second sensor 35 is provided to detect strain caused in second measuring diaphragm 26. In this instance, the second sensor comprises a shearing strain detection element. First sensor 34 and second sensor 35 are located on first measuring diaphragm 23 and second measuring diaphragm 26, respectively, as shown in FIG. 10.

A computation circuit 36 is provided (FIG. 11) to compute the difference between the output of first sensor 34 and the output of second sensor 35. The circuit 36 comprises power supply 361 to supply voltage to first sensor 34 and second sensor 35; amplifiers 362 and 363 to amplify the outputs from first sensor 34 and second sensor 35, respectively; and a differential amplifier 364 to amplify the difference between the outputs from amplifiers 362 and 363.

Returning again to FIGS. 5 and 6, a pressure inlet hole 37 is used to introduce measuring pressure $P_H$ into first communicating hole 32. Another pressure inlet hole 83 is used to introduce measuring pressure $P_L$ into second communicating hole 33.

In the foregoing embodiment, high pressure side measuring pressure $P_H$ is applied to third measuring cell 29 and second measuring cell 25 through first communicating hole 32. Low pressure side measuring pressure $P_L$ is applied to fourth measuring cell 31 and first measuring cell 21 through second communicating hole 33. Note in the drawings hole 33 is shown broken where the holes cross so as to not cause confusion of being connected to the hole connecting cells 29 and 25.

Figure 11:
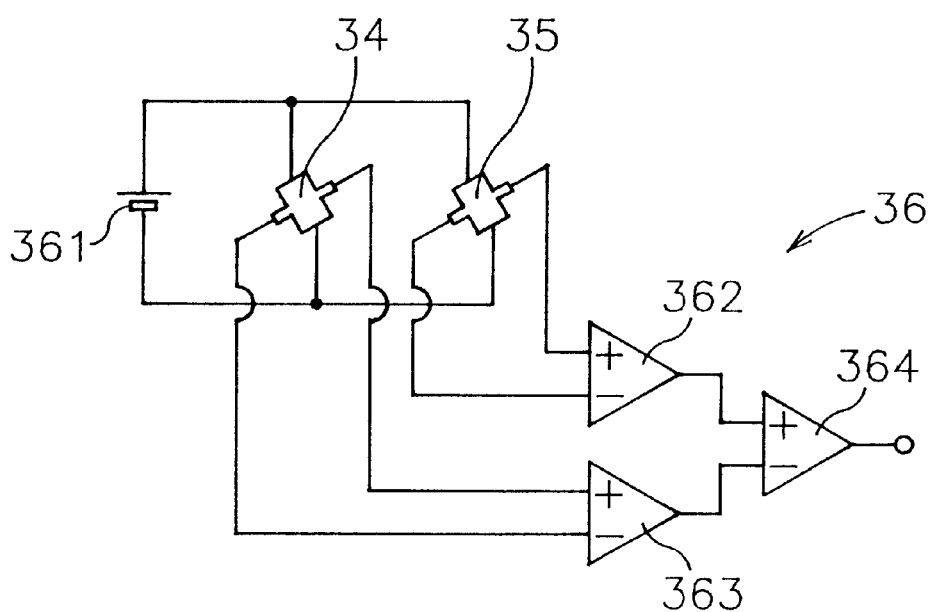
FIG. 11 is a drawing depicting parts of a computing circuit of the embodiment of FIG. 5.
Figure 12:
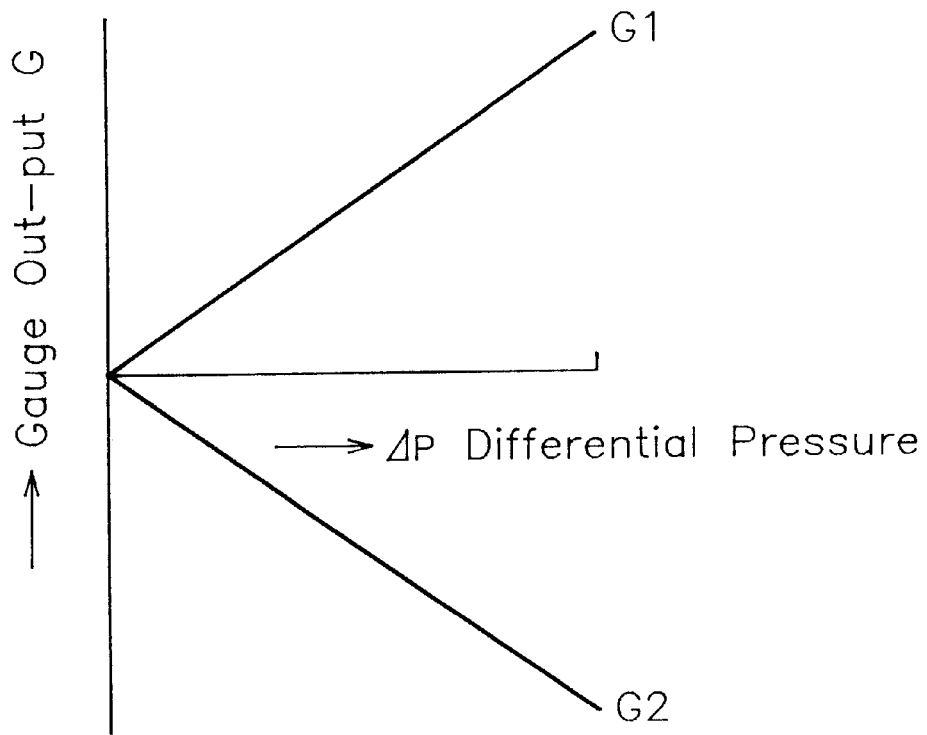
FIG. 12 is a graph depicting operation of the embodiment of FIG. 5.
Figure 13:
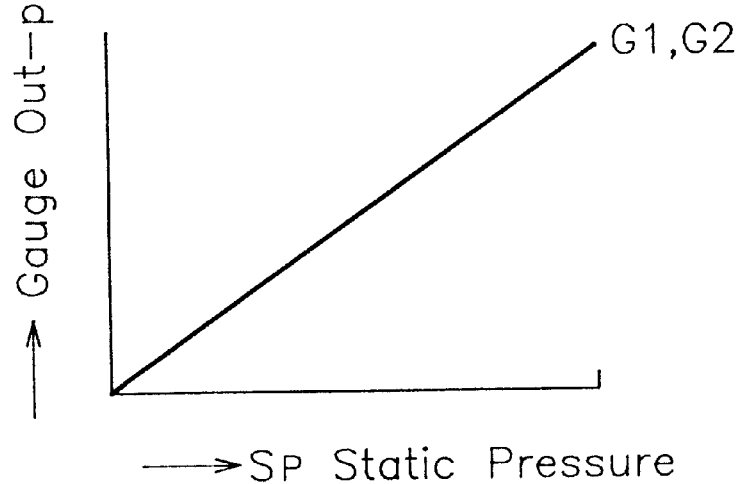
FIG. 13 is a graph depicting operation of the embodiment of FIG. 5.

Depending on the pressure difference between measuring pressures $P_H$ and $P_L$, first measuring diaphragm 23 and second measuring diaphragm 26 are distorted or strained. The strains are electrically detected by strain detection elements 34 and 35. The differential pressure is measured by computing the outputs of the first and second strain detection elements 34 and 35 using the computation circuit 36, such as shown in FIG. 11. In other words, first measuring diaphragm 23 and second measuring diaphragm 26 are caused to become deformed in almost opposite directions because their effective areas are almost the same. Gage output $G_1$ of detection element 34 and gage output $G_2$ of detection element 35 are opposite in phase for the differential pressure $\Delta P = P_H - P_L$, as shown in FIG. 12. If static pressure $S_p = P_H - P_L$ is applied, the deformation of first measuring diaphragm 23 is equal to that of the second measuring diaphragm 26 and their outputs are almost the same, as shown in FIG. 13.

If gage output $G_2$ of detection element 35 is subtracted from gage output $G_1$ of detection element 34, as in equation (2), an output signal which is proportional to only differential pressure $\Delta P$ is obtained as an output U whose amount of change is twice that of the individual outputs. On the other hand, if gage output $G_1$ of detection element 34 is added to the gage output $G_2$ of detection element 35, as in equation (3), output V, which varies only with static pressure $S_p$, is obtained without being affected by differential pressure $\Delta P$. Thus, output V can be used as a static pressure signal. Static pressure signal V can be used for highly precise calculations, such as for correction of sensitivity changes due to static pressure.

$$\Delta P = U = G_1 - G_2 \qquad (2)$$

$$S_p = V = G_1 + G_2 \qquad (3)$$

Measuring diaphragms 23 and 26 having the same effective area can be accurately formed on silicon substrate 22 utilizing semiconductor micromachining techniques, and are arranged to act in opposite directions to each other using communicating holes 32 and 33. As a result, the follow effects are obtained. The subtraction signal for the output of first detection element 34 and output of second detection element 35 can be obtained as a signal which is highly sensitive to differential pressure $\Delta P$ only. Moreover, the rate of change in the output, i.e. the sensitivity, is twice that of the individual detection element output. On the other hand, the addition signal for the output of first detection element 34 and the output of second detection element 35 can be obtained as a signal which is highly sensitive to static pressure $S_p$ only. Accordingly, subtraction or addition alone provides a highly precise differential pressure signal $\Delta P$ or static pressure signal $S_p$. Because of small mutual influences between differential pressure signal $\Delta P$ and static pressure signal $S_p$ in the calculations shown in below equation (4) for higher precision, it is sufficient to consider only small orders of calculation, n, m. Characteristics, other than static pressure $S_p$, e.g. temperature characteristics, are also cancelled by subtraction between the outputs of the first and second detection elements 34,35. Thus, excellent temperature characteristic are attained in the invention.

Figure 14:
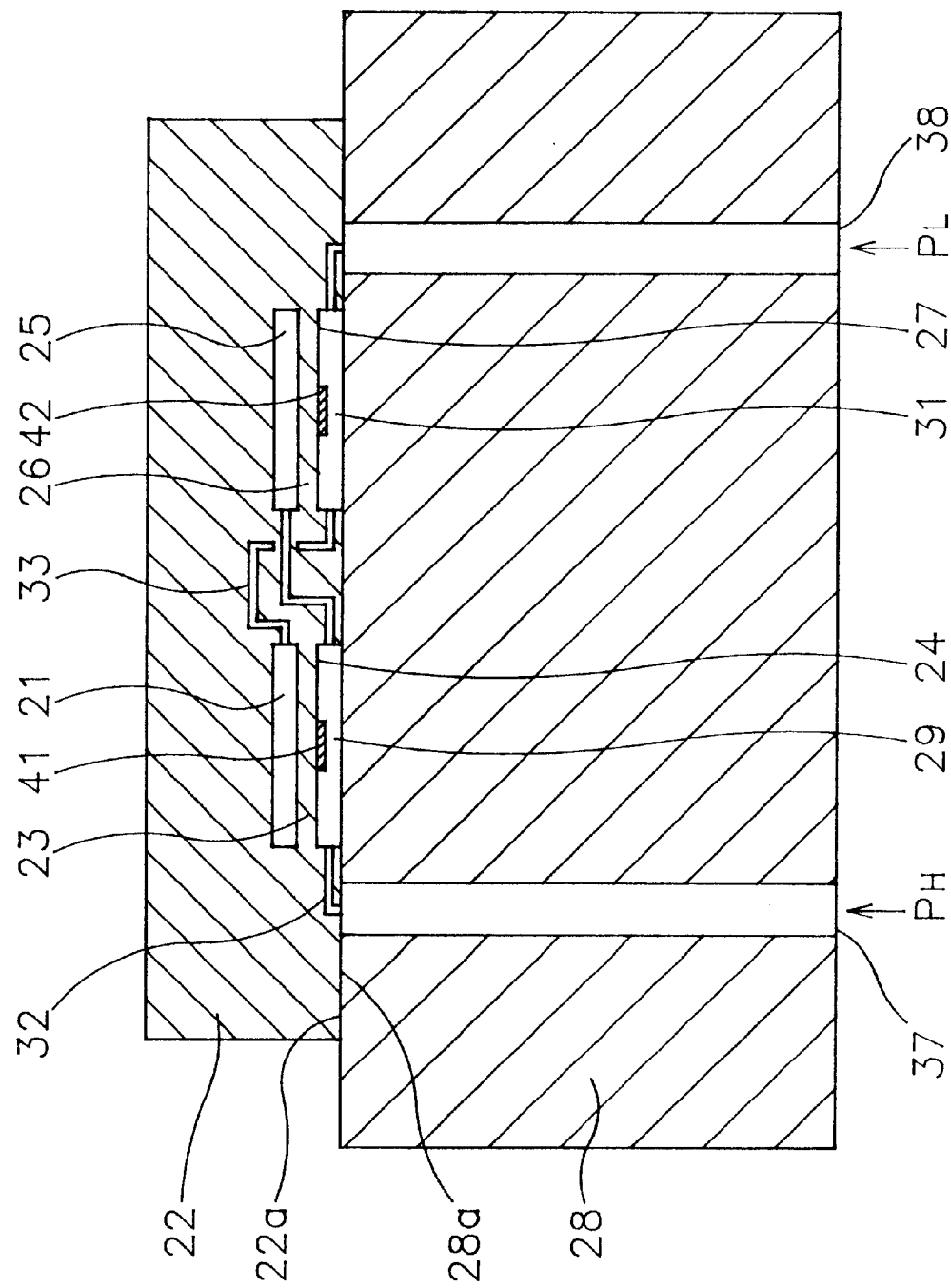
FIG. 14 is a cross sectional view depicting parts of a second illustrative embodiment of the invention.

FIG. 14 shows a second embodiment which differs from the first embodiment in that vibrating beams 41, and 42, whose natural frequencies vary with changes in strain, are used in place of first sensor 34 and second sensor 35, respectively. The second embodiment has the advantage of being capable of using frequency signals as the measuring signals. The signal of differential pressure $\Delta P$ is calculated as follows. Let the changed amount in the signals for the high pressure and low pressure producing the differential pressure $\Delta P$, be $f_H$ and $f_L$, respectively. Also, let the changed amount in the signals for the high and low pressures producing the static pressure $S_p$ be $f_{HS}$ and $f_{LS}$, respectively. Since first measuring diaphragm 23 and second measuring diaphragm 26 operate in opposite phases, the differential pressure $\Delta P$ output signal can be obtained by calculating the difference in the signals from vibrating beams 41 and 42, using the below equation (4).

$$\text{Differential pressure} \Delta P = P_H - P_L = K(f_{HO} - f_{LO}), \qquad (4)$$

wherein $f_{HO}$=changed amount of total high pressure side output signal;

$f_{LO}$=changed amount of total low pressure side output signal;

K=constant.

Since $f_{HO} = f_H + f_{HS}$ (equation 5), and since $f_{LO} = -f_L + f_{LS}$ (equation 6) and since $f_{HS} = f_{LS}$, then differential pressure $\Delta P = K[f_H - (-f_L)]$ (equation 7).

Figure 15:
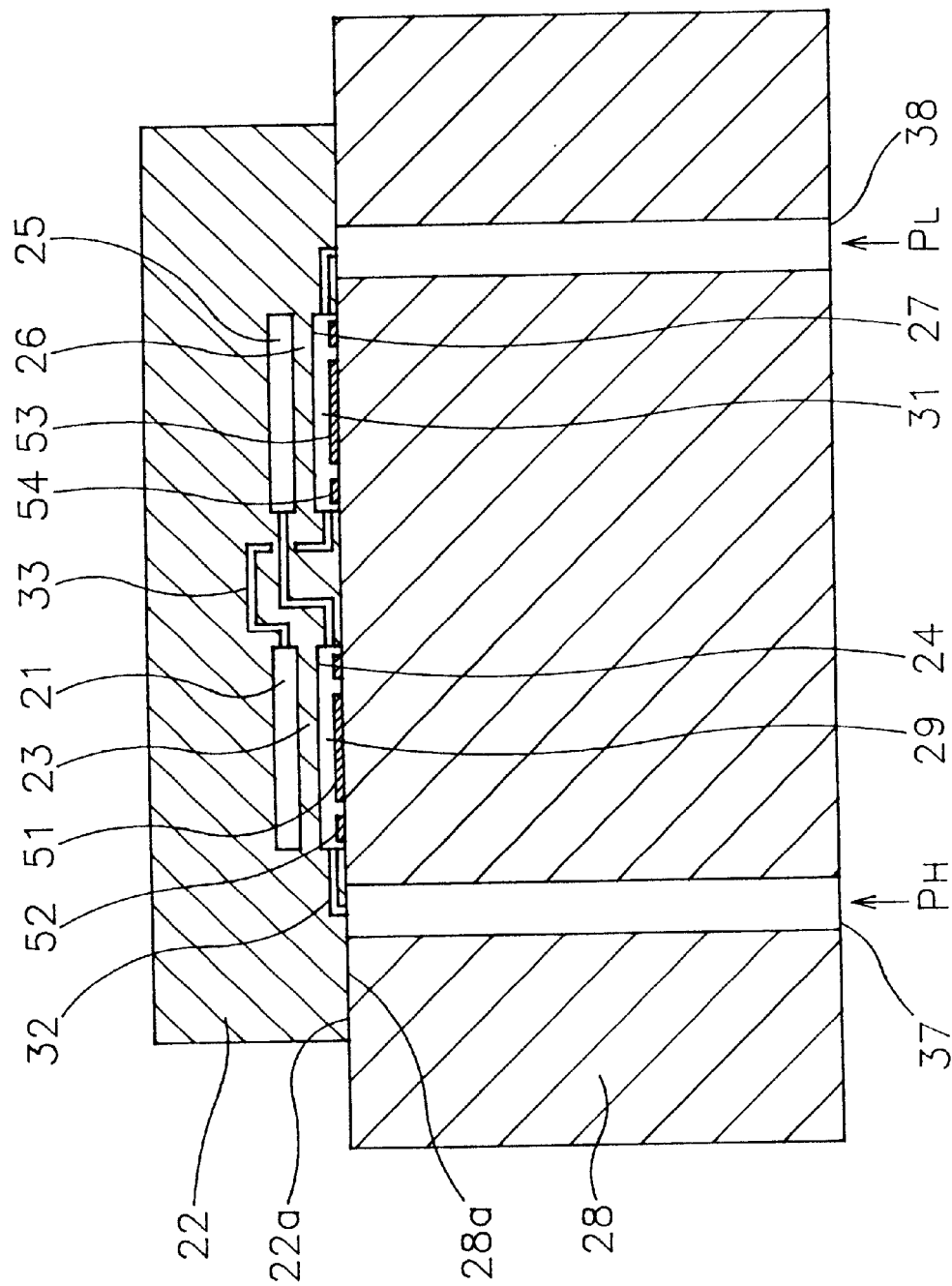
FIG. 15 is a cross sectional view depicting parts of a third illustrative embodiment of the invention.

FIG. 15 shows a third embodiment which differs from the first embodiment in that two sets of electrodes 51,52 and 53,54 are used in place of first sensor 34 and second sensor 35, respectively. The electrodes are concentrically arranged on surface 28a of support substrate 28 facing first diaphragm 23 and second diaphragm 26. This arrangement has the advantage that capacitance signals may be used as the measurement signals, as now explained. Differential pressure signal $\Delta P$ is calculated as follows. Let the capacitance signals between electrodes 51,52 and first diaphragm 23 and between electrodes 53,54 and second diaphragm 26/caused by differential pressure $\Delta P$ be $C_{H1}$, $C_{H2}$, $C_{L1}$, and $C_{L2}$, respectively, and let signals generated by static pressure $S_p$ be $C_{HS1}$, $C_{HS2}$, $C_{LS1}$ and $C_{LS2}$, respectively. Since measuring diaphragms 23 and 26 operate in opposite phases, the output signal for $\Delta P$ can be obtained by making the following calculations.

The displacement of diaphragms 23 and 26, $\delta_{HO}$ and $\delta_{LO}$ are represented by $$\delta_{HO} = K(C_{H2} - C_{H1}) \qquad (8)$$

$$\delta_{LO} = K(C_{L2} - C_{L1}) \qquad (9)$$

Displacements $\delta_{HO}$ and $\delta_{LO}$ are further divided into differential and static components, respectively.

$$\delta_{HO} = \delta_H + \delta_{HS} \qquad (10)$$

$$\delta_{LO} = -\delta_L + \delta_{LS} \qquad (11).$$

Therefore, the difference between equations (8) and (9) constitute the differential pressure signal, and the sum of equations (8) and (9) constitute the static pressure signal. Thus, differential pressure $$\Delta P = \delta_{HO} - \delta_{LO} = K[(C_{H2} - C_{H1}) - (C_{L2} - C_{L1})] \qquad (12)$$

As a result, the following effects are obtained. The signal obtained by computing the difference between the output from the first detection element and the output from the second detection element can be used as a signal which is highly sensitive to differential pressure only. In addition, the rate of change in output, i.e. sensitivity, doubles. On the other hand, the signal obtained by computing the sum of the outputs from the first and second detection elements can be used as a signal which is highly sensitive to static pressure only. Accordingly, computation of the difference or the sum alone provides a highly precise differential pressure signal or static pressure signal. Since there is only a small cross influence between the differential pressure signal and the static pressure signal, a smaller order of computation is required in order to attain higher precision of computation. Also, the characteristics, other than static pressure, e.g. temperature characteristics, are cancelled by computation of the difference between the outputs from the first and second detection elements, so that an arrangement is provided which has excellent temperature characteristics.

Advantageously, the invention can use as measurement signals analog signals, frequency signals, or capacitance signals. Moreover, the invention has excellent static pressure and temperature characteristics.

Figure 5:
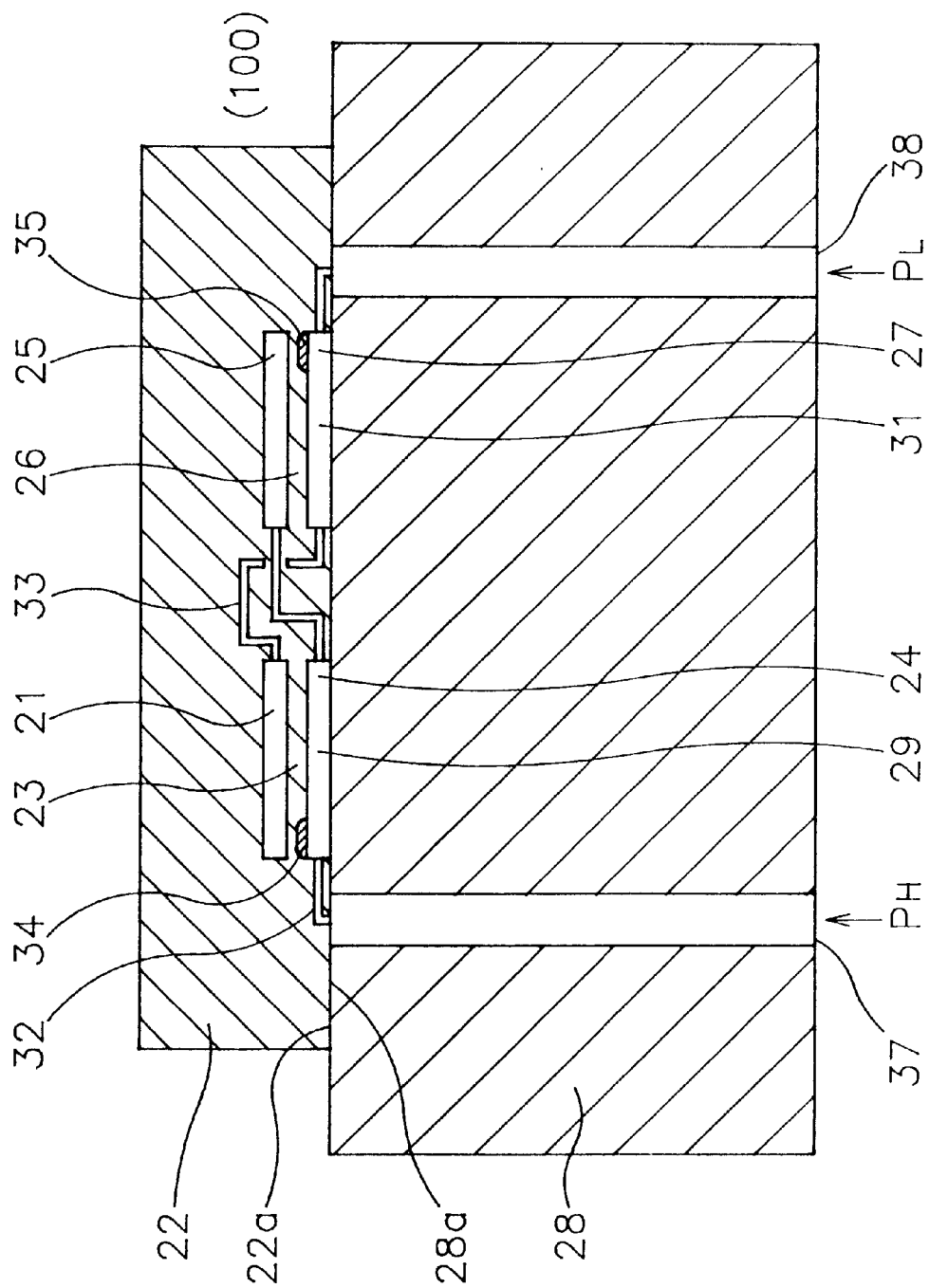
FIG. 5 is a cross sectional view depicting part of a first illustrative embodiment of the invention.
Figure 6:
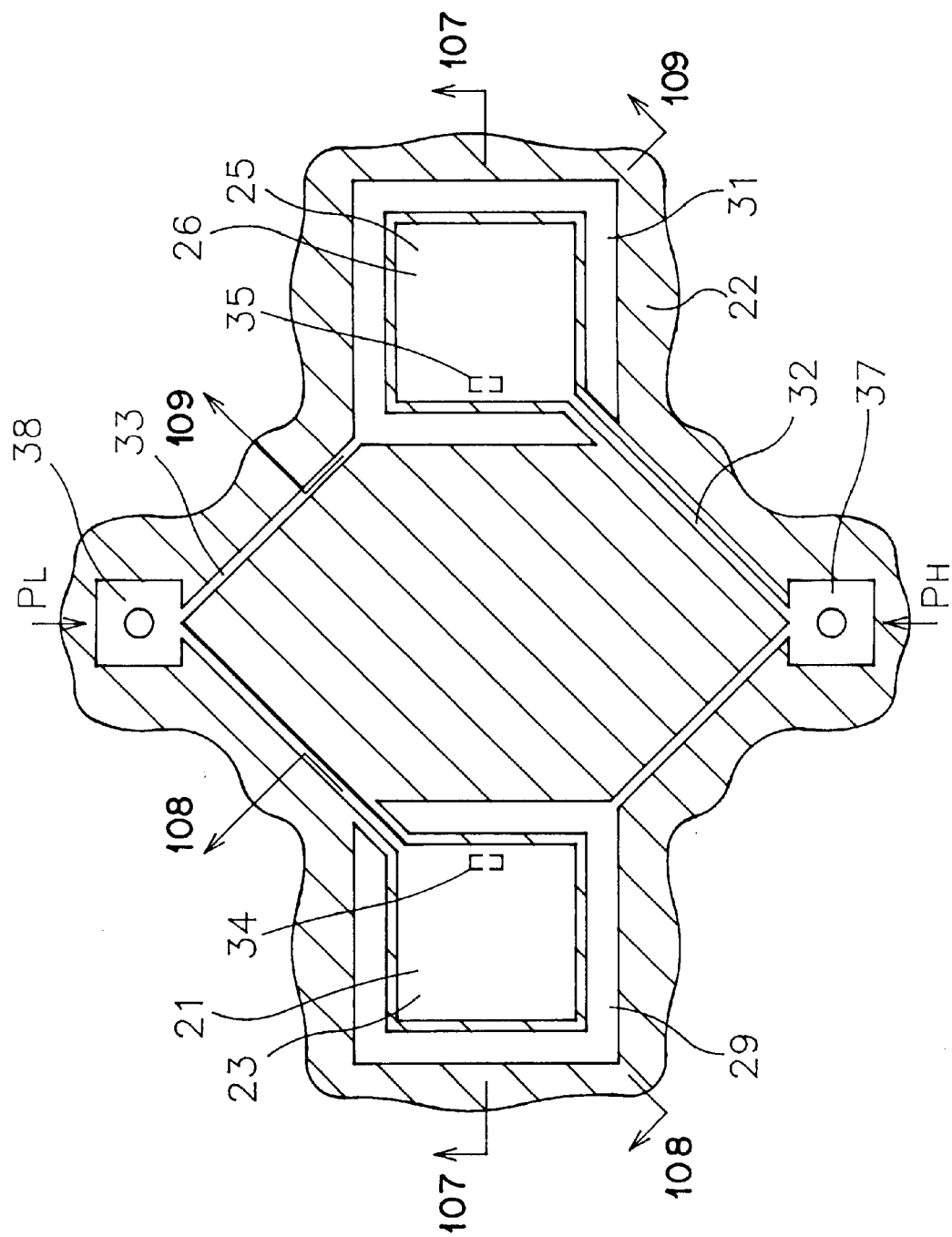
FIG. 6 is a cross sectional view depicting parts of the embodiment of FIG. 5.
Figure 7:
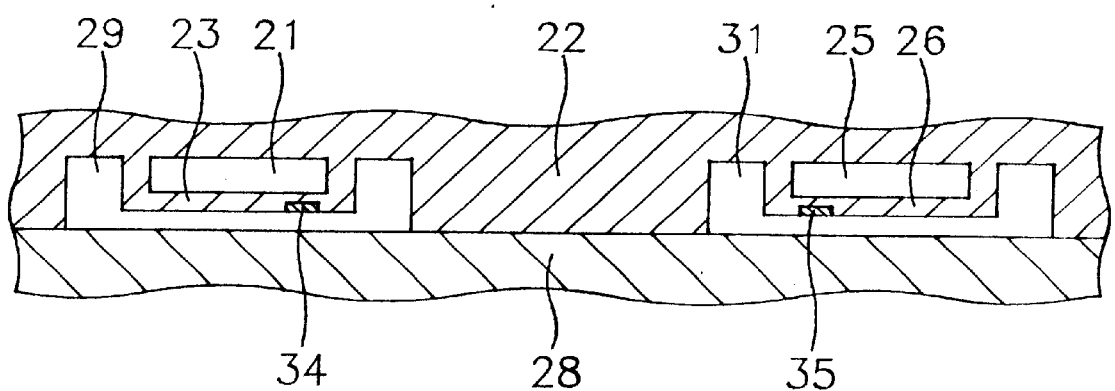
FIG. 7 is a cross sectional view taken along line 107—107 in FIG. 6.
Figure 8:
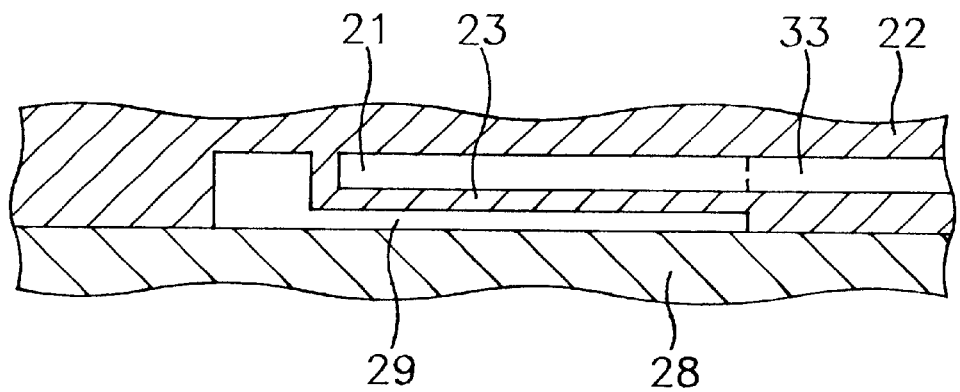
FIG. 8 is a cross sectional view taken along line 108—108 in FIG. 6.
Figure 9:
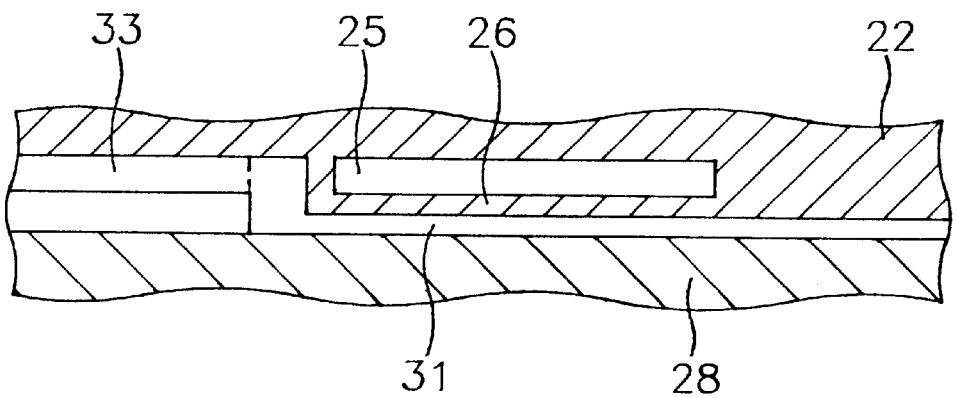
FIG. 9 is cross sectional view taken along line 109—109 in FIG. 6.
Figure 16:
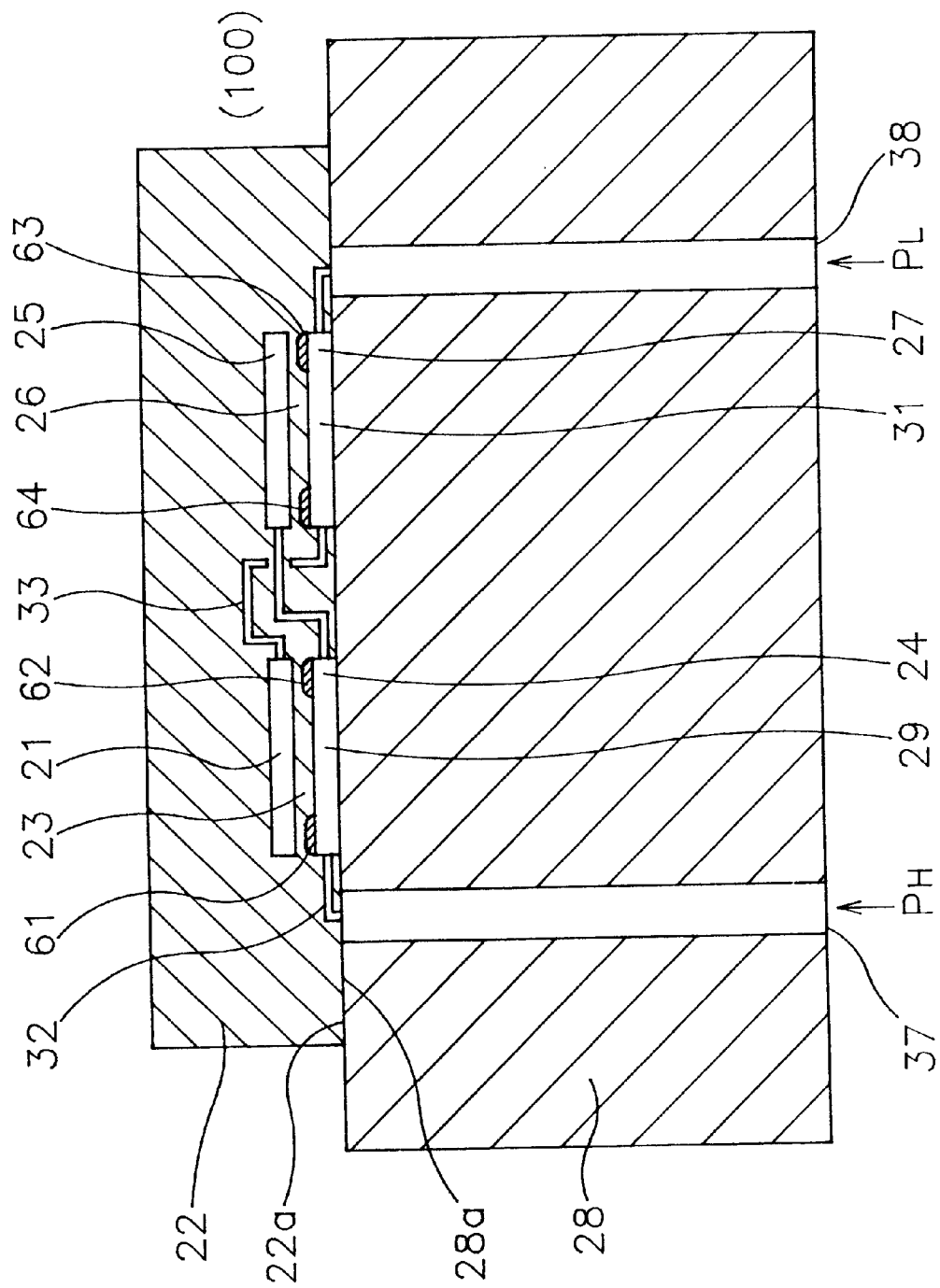
FIG. 16 is a cross sectional view depicting parts of a third illustrative embodiment of the invention.
Figure 17:
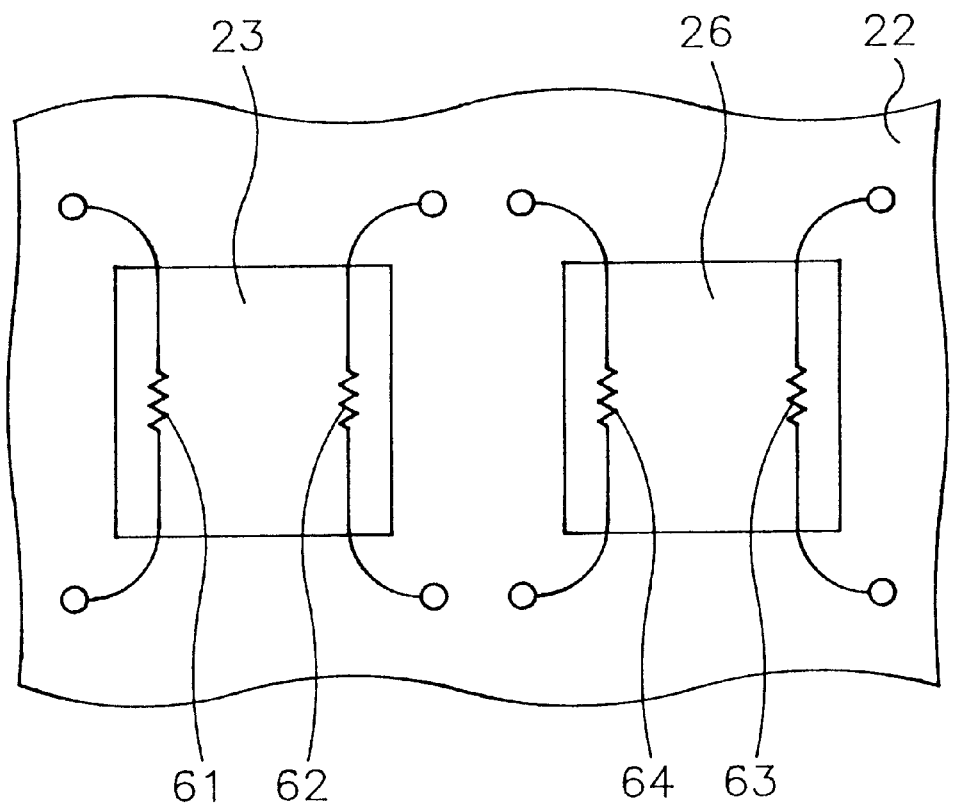
FIG. 17 is a drawing depicting details of the fourth embodiment of FIG. 16.
Figure 18:
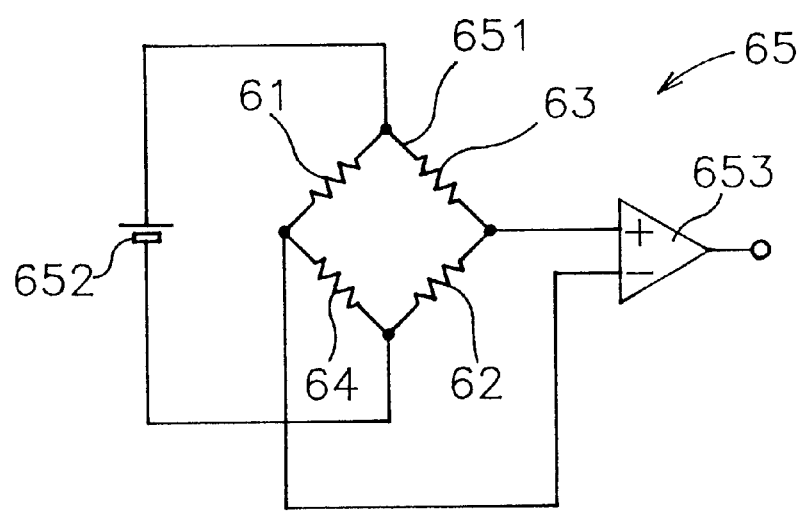
FIG. 18 is a circuit diagram depicting parts of the computation circuit of the arrangement of FIG. 17.

FIGS. 16–18 show a fourth embodiment, wherein the components having the same symbols as in FIG. 5 represent the same functions and only the parts different from FIG. 5 are described hereat for sake of clarity. FIG. 16 shows first sensors 61,62 which detect strain generated in first diaphragm 23, and are arranged along the sides in a direction which is vertical to diaphragm 23 as also shown in FIG. 17. The sensors 61,62 comprise strain gages. Second sensors 63 and 64 are provided which detect the strain generated in second diaphragm 26 and are arranged along the sides in a direction vertical to diaphragm 26, as shown also in FIG. 17. Sensors 63 and 64 are strain gages.

FIG. 18 shows a computation circuit 65 wherein electrical output signals corresponding to the differential pressure being measured is obtained by computing the difference between the output results from first sensors 61,62 and second sensors 63,64. The computation circuit 65 comprises a bridge circuit 65 comprising first sensors 61,62 and second sensors 63,64; power supply 652 which provides voltage between one power supply terminal connecting sensors 61,63 and the other power supply terminal connecting sensors 62 and 64; and amplifier 653 which amplifies the output from between one output terminal connecting sensors 61 and 64, and the other output terminal connecting sensors 63 and 62. First sensors 61 and 62 and second sensors 63 and 64 detect the same strain for a differential pressure being measured. However, for a temperature change or static pressure, first sensor 61 and second sensor 63, detect the same strain and first sensor 62 and second sensor 64 detect another strain which is the same, based on the symmetry of the arranged bridge positions. Thus, with such an arrangement, even if the temperature changes or static pressure is applied, the output from bridge 651 does not change when the outputs from first sensor 61 and second sensor 63 vary. Similarly, the output from bridge 651 does not change when the output from first sensor 62 and second sensor 64 vary.

In the embodiment of FIG. 16, a high pressure side measurement pressure $P_H$ is applied to third measuring cell 29 and second measuring cell 25 via first communicating hole 32. A low pressure side measurement pressure $P_L$ is applied to fourth measuring cell 31 and first measuring cell 21 via second communicating hole 33.

Figure 19:
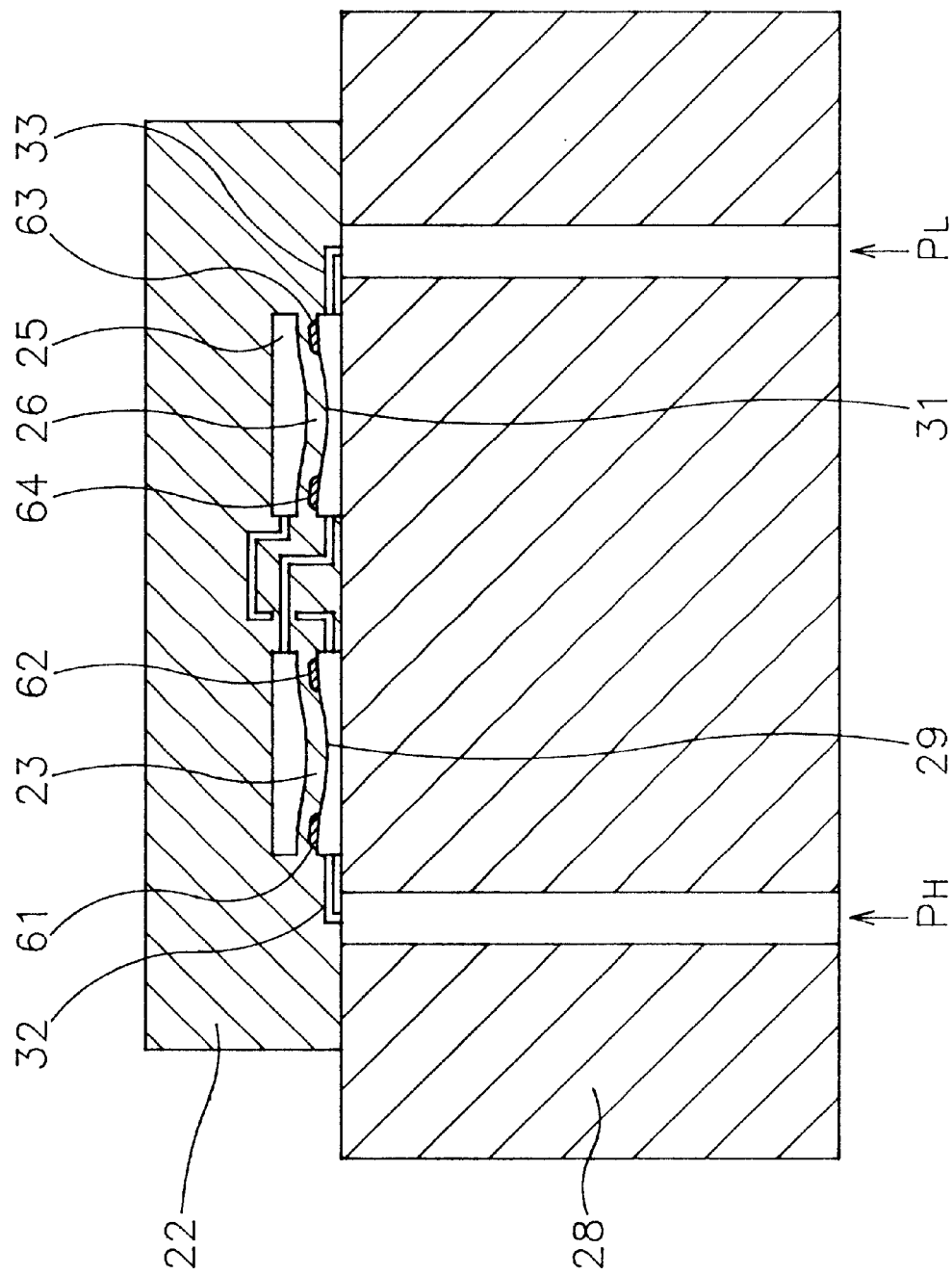
FIG. 19 is a drawing depicting operation of the embodiment of FIG. 16.

FIG. 19 shows a fourth embodiment wherein the pressure difference between the high pressure side measuring pressure $P_H$ and the low pressure side measurement pressure $P_L$ causes first measuring diaphragm 23 and second measuring diaphragm 26 to be distorted and to generate strain. The strains are electrically detected by first sensors 61 and 62, and second sensors 63 and 64.

Figure 20:
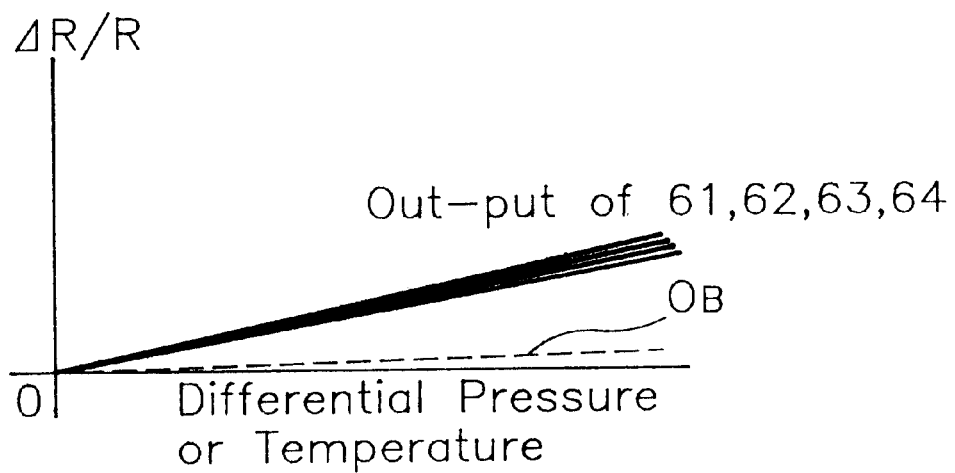
FIG. 20 is a graph depicting operation of the embodiment of FIG. 16.
Figure 21:
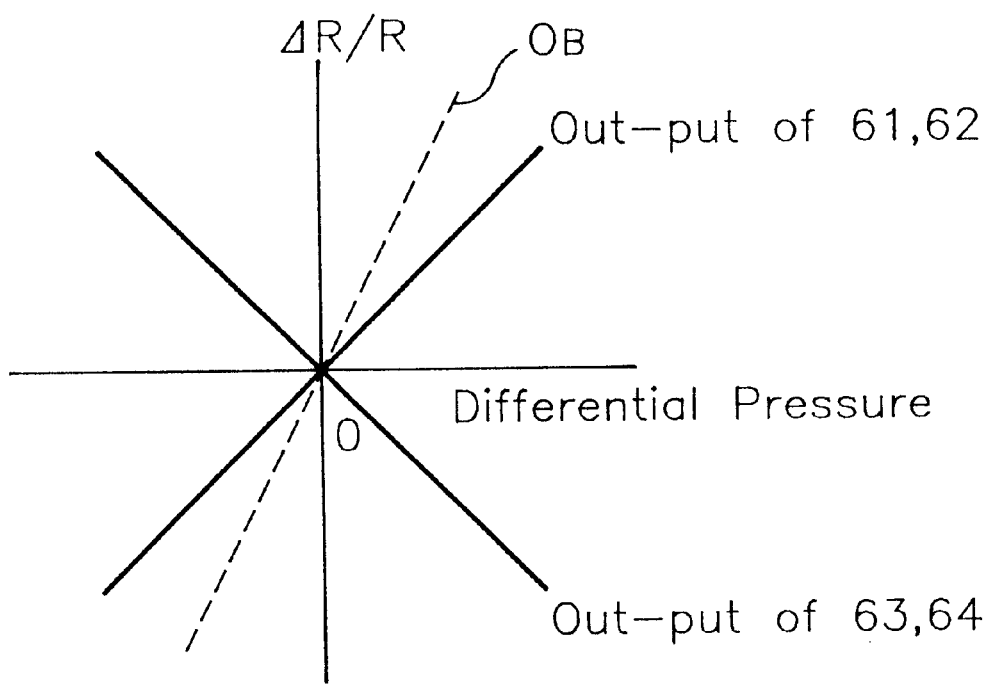
FIG. 21 is a graph depicting operation of the embodiment of FIG. 16.

Computation circuit 65 of FIG. 18, for example, computes the difference between the outputs from first sensors 61 and 62, and second sensors 63, and 64, using bridge circuit 651, and produces an output signal which corresponds to the differential pressure being measured. This arrangement, advantageously, reduces the error due to static pressure and temperature. That is, the rates of resistance change $\Delta R/R$ in first first sensors 61 and 62, and second sensors 63 and 64 are nearly equal for static pressure and temperature, as shown in FIG. 20. Thus, the rate of resistance change $\Delta R/R$ of the bridge output $O_B$ becomes small, while the rates of resistance change $\Delta R/R$ for the differential pressure in first sensors 61 and 62 are equal to that in second sensors 63 and 64, but opposite in phase. Thus, the rate of resistance change $\Delta R/R$ of bridge output $O_B$ becomes large, as shown in FIG. 21. Accordingly, simple measurement of output signal from bridge 651 can reduce errors due to static pressure and temperature. The computation circuit 65 is simple to manufacture and cost of manufacture is reduced by using bridge 651 comprising the first sensors 61,62 and second sensors 63,64 provided on the two diaphragms 23, 26, respectively, connected in opposite phase. Although three amplifiers are shown as being used in computation circuit 36, only one amplifier is used in computation circuit 65.

Figure 22:
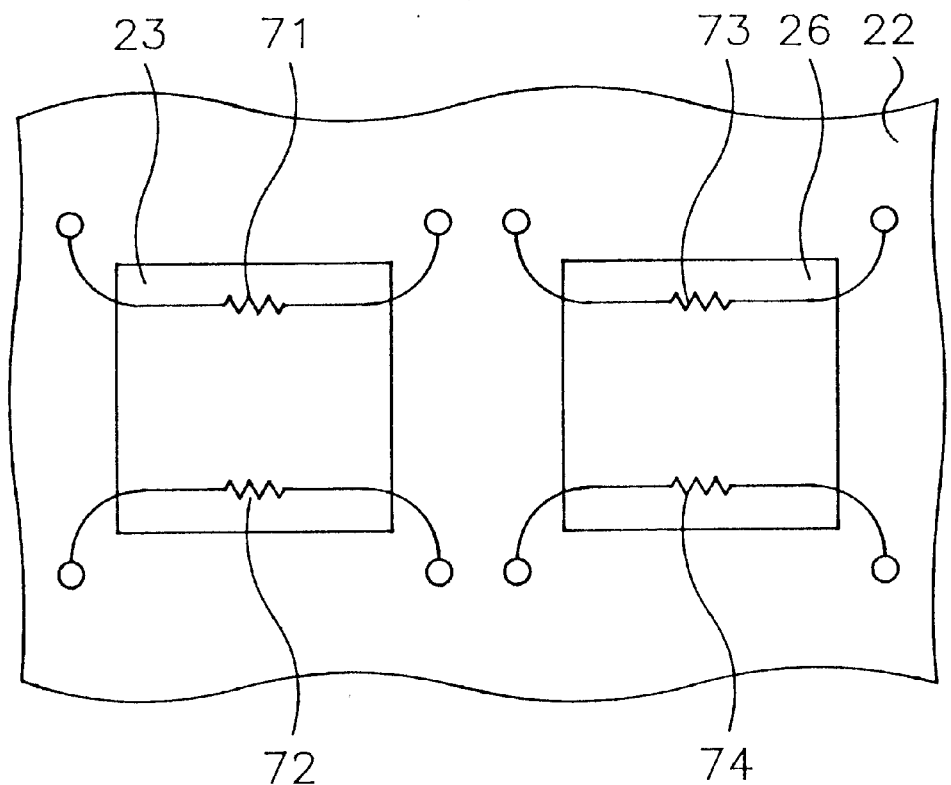
FIG. 22 is a drawing depicting parts of a fifth illustrative embodiment of the invention.

FIG. 22 shows a fifth embodiment comprising first sensors 71,72 which detect strain generated in first measuring diaphragm 23 and are arranged along the sides in a direction which is horizontal to diaphragm 23, and second sensors 73,74 which detect the strain generated in second measuring diaphragm 26 and are arranged along the sides in a direction which is horizontal to the diaphragm 26.

Figure 23:
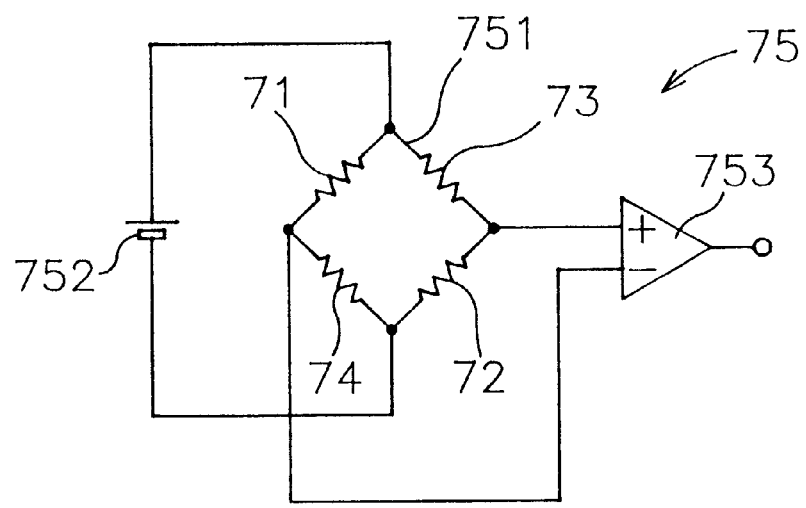
FIG. 23 is a circuit diagram depicting parts of the computation circuit of the embodiment of FIG. 22.

FIG. 23 shows a computation circuit 75 wherein an electrical signal output corresponding to the differential pressure being measured is obtained by computing the difference between the output signals from first sensors 71,72 and from second sensors 73,74. The computation circuit 75 comprises a bridge circuit 751 comprising first sensors 71,72 and second sensors 73,74; a power supply 752 which provides voltage between one power supply terminal connecting sensors 71 and 73, and the other power supply terminal connecting sensors 72 and 74; and an amplifier 753 which amplifies the output signals from one output terminal connecting sensor 71 and sensor 74, and the other terminal connecting sensors 73 and 72. In the foregoing arrangement, the operation and effect are the same as that of the embodiment of FIG. 16.

Figure 24:
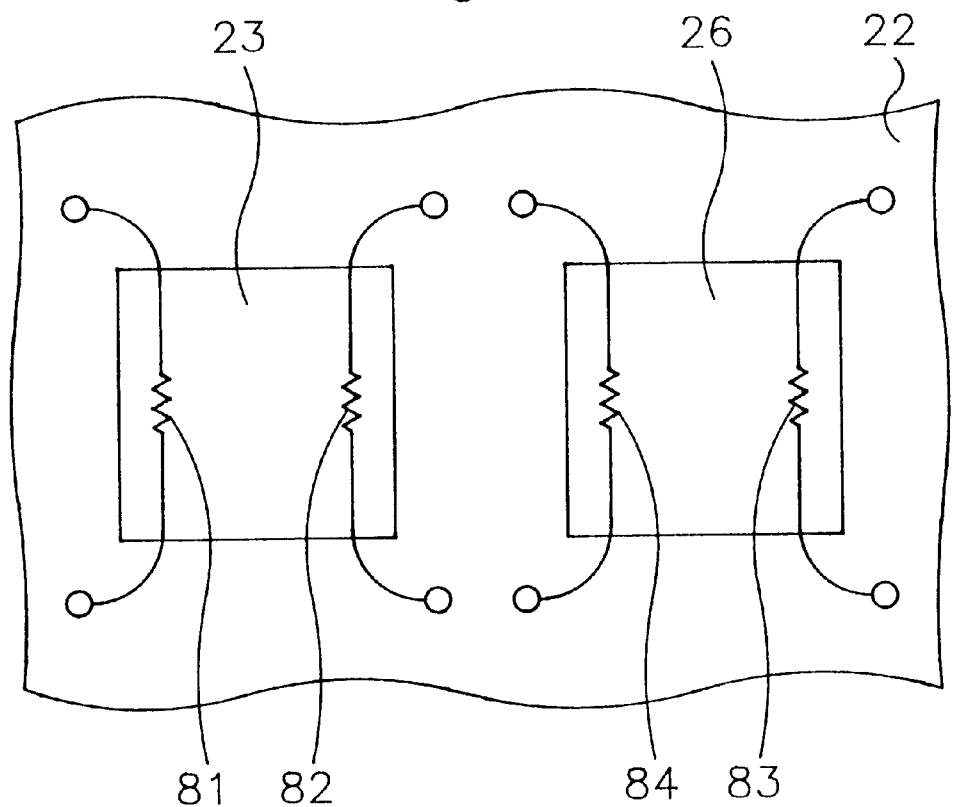
FIG. 24 is a diagram depicting parts of a sixth illustrative embodiment of the invention.

FIG. 24 shows a sixth embodiment comprising first sensors 81,82 which detect strain generated in first measuring diaphragm 23 and are arranged near the center of diaphragm 23 and in parallel with a side of diaphragm 23, and second sensors 83,84 which detect strain generated in second measuring diaphragm 26 and are arranged near the center of diaphragm 26 and in parallel with a side of diaphragm 26. In this embodiment, silicon substrate 22 comprises a (110) wafer. Because a (110) wafer is used, strain gages are sensitive even near the center of the first measuring diaphragm 23 and the center of the second measuring diaphragm 26.

Figure 25:
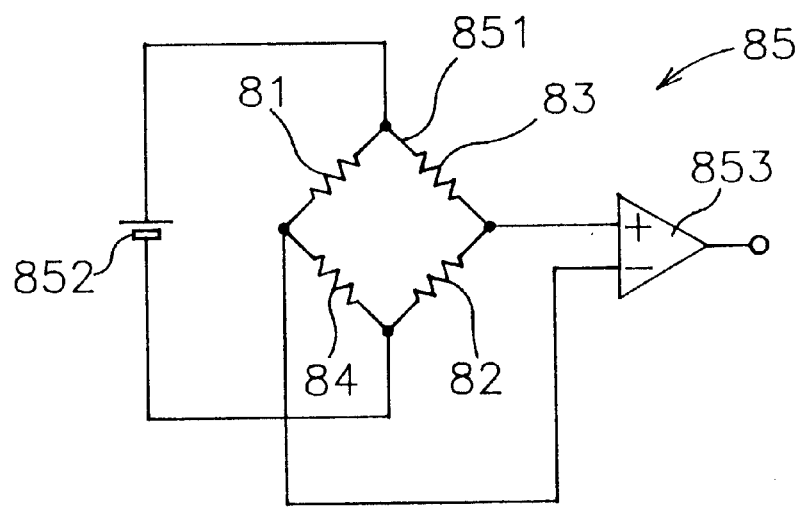
FIG. 25 is a circuit diagram depicting parts of the computation circuit of the embodiment of FIG. 24.

FIG. 25 shows a computation circuit 85 wherein an electrical signal corresponding to the differential pressure being measured is produced by computing the difference between the outputs from the first sensors 81,82 and the second sensors 83,84. The computation circuit 85 comprises a bridge circuit 851 comprising first sensors 81,82, and second sensors 83,84; a power supply 852 which provides voltage between one power supply terminal connecting sensors 81 and 83, and the other power supply terminal connecting sensors 82 and 84; and an amplifier 853 which amplifies the output between one output terminal connecting sensors 81 and 84, and the other output terminal connecting sensors 83 and 82. In the embodiment, the operation and effect are the same as the embodiment of FIG. 16.

Figure 26:
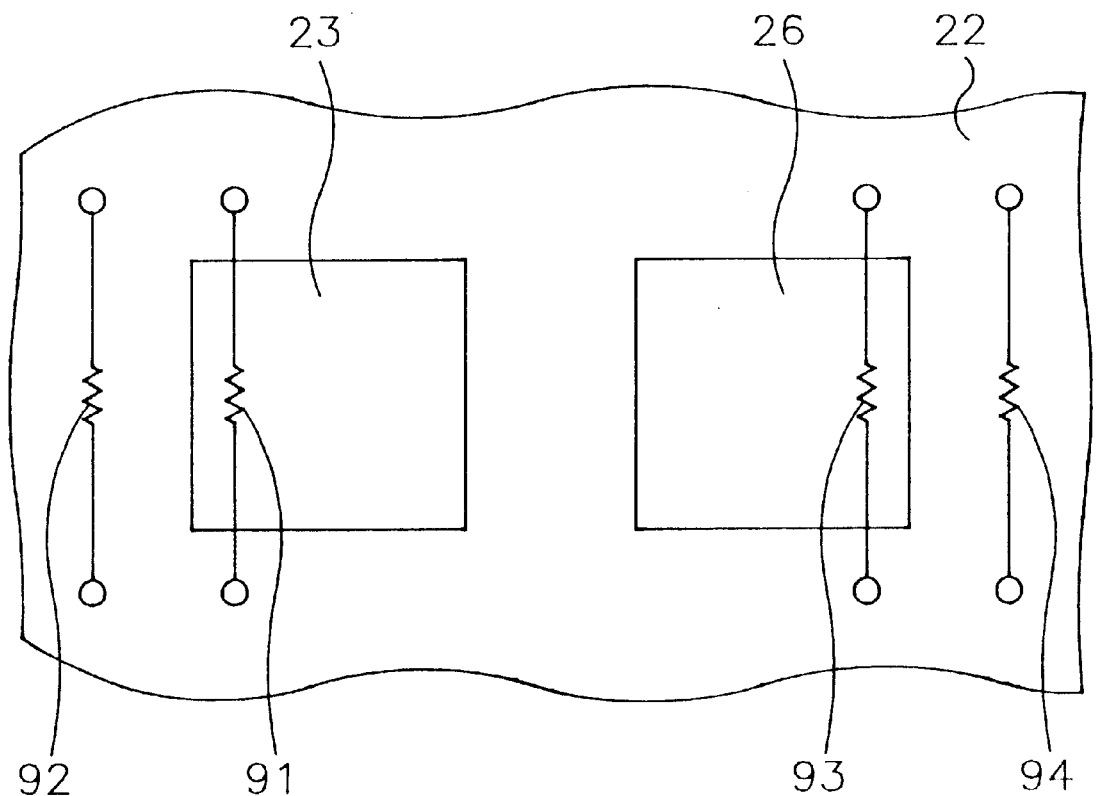
FIG. 26, is a drawing depicting parts of a seventh illustrative embodiment of the invention.

FIG. 26 shows a seventh embodiment comprising first sensor 91 which detects strain generated in first measuring diaphragm 23 by the differential pressure being measured, with first sensor 91 being arranged along the vertical side of diaphragm 23; a second sensor 93 which detects strain generated in second measuring diaphragm 26 by the differential pressure being measured with the second sensor 93 being arranged along the vertical side of second diaphragm 26; and a third sensor 72, and a fourth sensor 74 provided on silicon substrate 22 and symmetrically positioned about the first and second diaphragms 23 and 26. The third and fourth sensors 92 and 94 are provided so that static pressure and temperature compensation can be effectively obtained.

Figure 27:
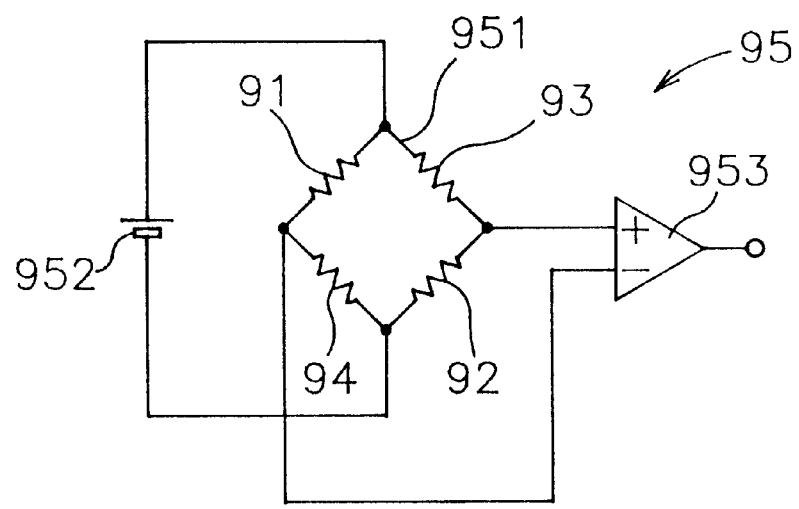
FIG. 27 is a circuit diagram depicting parts of the computation circuit of the embodiment of FIG. 26.

FIG. 27 shows a computation circuit 95 wherein an electrical signal output corresponding to the differential pressure being measured is obtained by computing the difference between the outputs from first sensor 91 and second sensor 93. The computation circuit 95 comprises a bridge circuit 951 comprising first sensor 91, second sensor 93, third sensor 92, and fourth sensor 94; a power supply 952 which provides voltage between one power supply terminal connecting first sensor 91 and second sensor 93, and the other power supply terminal connecting third sensor 92 and fourth sensor 94; and an amplifier 953 which amplifies the output between one output terminal connecting first sensor 91 and fourth sensor 94, and the other output terminal connecting second sensor 93 and third sensor 92. In the embodiment, the operation and effect are the same as the embodiment of FIG. 16.

In addition to the foregoing embodiments, the invention is not limited to such connections shown in the drawing. For example, the bridge may be so arranged that means be provided for detecting differential pressure so that at least one first sensor and one second sensor be arranged in adjacent arms of a bridge be used to obtain an electrical signal corresponding to the differential pressure being measured. The other two arms can comprise ordinary resistor elements. Moreover, although a silicon substrate 22 is used, other types of semiconductors may be used, such as gallium arsenide or silicon carbide. Furthermore, although the diaphragms have been described as having the same effective area, the invention is not so limited. If the thickness of the two differ, then, the areas need not be the same. If the areas are different, there need not be any compensation means used. Any type of measuring diaphragms may be used.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A semiconductor differential pressure measuring device comprising:

a semiconductor substrate having a first surface;

a first chamber provided in said semiconductor substrate near said first surface of said semiconductor substrate and having a first effective volume;

a first diaphragm provided to define one wall of said first chamber and being made as one body with said semiconductor substrate from the beginning and of the same material as said semiconductor substrate and having a first effective surface area;

a first concave portion provided on said first diaphragm and having a second effective volume which is the same as said first effective volume of said first chamber;

a second chamber provided in said semiconductor substrate near said first surface of said semiconductor substrate and having a third effective volume which is the same as said first effective volume of said first chamber;

a second diaphragm provided to define one wall of said second chamber and being made as one body with said semiconductor substrate from the beginning and of the same material as said semiconductor substrate;

wherein said second diaphragm has a second effective surface area which is the same as said first effective surface area of said first diaphragm, and which is formed at the same time said first diaphragm is formed;

a second concave portion provided on said second diaphragm and having a fourth effective volume which is the same as said first effective volume of said first chamber;

a support substrate having a surface in contact with said first surface of said semiconductor substrate, said support substrate and said first concave portion forming therebetween and in said semiconductor substrate a third chamber, and said support substrate and said second concave portion forming therebetween and in said semiconductor substrate a fourth chamber so that said first diaphragm is located between said first and third chambers and is movable by a first difference in pressures applied respectively thereto and so that said second diagram is located between said second and fourth chambers and is movable by a second difference in pressures applied respectively thereto;

a first communicating hole having a first and second end and provided in at least said support substrate with a first measurement pressure being applied to said first end of said first communicating hole and said second end of said first communicating hole being in communication with said third and second chambers;

a second communicating hole having a first and second end and provided in at least said support substrate with a second measurement pressure being applied to said first end of said second communicating hole and said second end of said second communicating hole being in communication with said fourth and first chambers;

first sensor means disposed in contact with said first diaphragm for detecting displacement or strain caused in said first diaphragm by said first difference between said first and second measurement pressures;

second sensor means disposed in contact with said second diagram for detecting displacement or strain caused in said second diaphragm by said second difference between said first and second measurement pressures; and computing means connected to said first and second sensor means for computing a third difference between output signals from said first sensor means denoting said first difference of pressures and said second sensor means denoting said second difference of pressures, and using said third difference for generating a signal corresponding accurately to the measured difference between said first and second measurement pressures.

2. The device of claim 1, wherein said first and second sensor means comprise strain gages.

3. The device of claim 1, wherein said first and second sensor means comprise vibration strain sensors.

4. The device of claim 1, wherein said first and second sensor means comprise capacitance sensors.

5. The device of claim 1, wherein said computing means comprises a bridge comprising said first and second sensor means arranged in adjacent arms of said bridge so as to obtain an output signal corresponding to said difference in pressures being measured.

6. The device of claim 5, further comprising said third and fourth sensor means being provided symmetrically of each other and about said first and second diaphragms; and means for detecting differential pressure arranged to obtain an output signal corresponding to said difference in pressures being measured, by arranging said first and second sensor means in two arms of said bridge with a connecting terminal between said two arms of said bridge forming a power supply terminal, and by further providing third and fourth sensor means in another two arms of said bridge with a connecting terminal between said two other arms forming another power supply terminal of said bridge.

7. The device of claim 5, further comprising means for detecting differential pressure arranged to obtain an output signal corresponding to said difference in pressures being measured by arranging said first and second sensor means in two arms of said bridge with a connecting terminal therebetween forming a power supply terminal of said bridge, and by further providing two resistor elements in another two arms of said bridge with a connecting terminal therebetween forming another power supply terminal of said bridge.

* * * * *